US008112566B2

(12) United States Patent
Chang

(10) Patent No.: US 8,112,566 B2
(45) Date of Patent: Feb. 7, 2012

(54) METHODS AND APPARATUSES FOR PROCESSING I/O REQUESTS OF DATA STORAGE DEVICES

(75) Inventor: I Chia Chang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 11/810,546

(22) Filed: Jun. 6, 2007

(65) Prior Publication Data

US 2008/0307130 A1  Dec. 11, 2008

(51) Int. Cl.
*G06F 13/12* (2006.01)
*G06F 13/38* (2006.01)

(52) U.S. Cl. .......... 710/74; 710/106; 710/107; 710/310; 711/151

(58) Field of Classification Search .................. None
See application file for complete search history.

(56) References Cited

U.S. PATENT DOCUMENTS

| 5,528,513 | A | * | 6/1996 | Vaitzblit et al. | ........... | 718/103 |
| 5,687,316 | A | * | 11/1997 | Graziano et al. | ........... | 709/250 |
| 5,778,445 | A | * | 7/1998 | Ooe et al. | ........... | 711/167 |
| 6,018,790 | A | * | 1/2000 | Itoh et al. | ........... | 711/114 |
| 6,330,646 | B1 | * | 12/2001 | Clohset et al. | ........... | 711/158 |
| 6,934,818 | B2 | * | 8/2005 | Okada | ........... | 711/154 |
| 7,054,249 | B2 | * | 5/2006 | Okada | ........... | 369/53.11 |
| 7,277,984 | B2 | * | 10/2007 | Ghosal et al. | ........... | 711/112 |
| 2005/0114860 | A1 | * | 5/2005 | Lin et al. | ........... | 718/100 |
| 2005/0138251 | A1 | * | 6/2005 | Fanning | ........... | 710/107 |
| 2007/0294449 | A1 | * | 12/2007 | Hauck et al. | ........... | 710/240 |
| 2008/0198780 | A1 | * | 8/2008 | Sato | ........... | 370/310 |

OTHER PUBLICATIONS

Huang et. al, QoS for storage subsystems using IEEE-1394, ACM Journal, vol. 4 Issue 4, Jan. 2009, Article 12.*

* cited by examiner

*Primary Examiner* — Tariq Hafiz
*Assistant Examiner* — Aurangzeb Hassan
(74) *Attorney, Agent, or Firm* — Schubert Law Group PLLC

(57) ABSTRACT

Methods and apparatuses for processing input and/or output requests for data storage devices are disclosed. Method embodiments generally comprise receiving a number of requests, wherein at least one of the requests is an isochronous request having an initial deadline value, calculating a new deadline value for the isochronous request, and issuing the isochronous request when the new deadline value is less than a threshold value. Apparatus embodiments generally comprise a request receiver to receive a number input or output requests, a logic module to calculate a deadline value for an isochronous request, where the calculated deadline value relates to the amount of time which has transpired between the creation of the isochronous request and the time the calculation is made, and an issuance module to issue the isochronous request if the calculated deadline value is equal or less than a threshold value.

24 Claims, 4 Drawing Sheets

METHODS AND APPARATUSES FOR PROCESSING I/O REQUESTS OF DATA STORAGE DEVICES

FIELD

The embodiments herein generally relate to the field of data storage devices. More particularly, the embodiments relate to methods and apparatuses for processing input/output requests for data storage devices.

BACKGROUND

People are continually expanding the uses of computers and digital media devices in homes, workplaces, schools, and universities. For example, a recent trend involves people recording audio and video streams using devices such as digital audio samplers and video camcorders, as well as portable media recorders and players. People may record audio and video data onto temporary storage mediums, such as analog or digital cassette tapes, and transfer those multimedia streams to more permanent storage mediums, such as digital versatile discs (DVDs) and compact discs (CDs). To transfer such streams from one storage medium to another, people may use desktop or laptop computers. These transfers tend to use a mass storage device to temporarily store the data, which may be a hard disk drive or an optical storage drive.

Multimedia streams frequently require adherence to critical transfer timing parameters. If the mass storage device misses a timing parameter, such as a transfer deadline, it may create error-laden or inferior quality multimedia streams, such as dropped frames of video information. While a user plays back the multimedia content, dropped frames can significantly reduce the user experience.

To complicate matters, additional operating factors may also impact or affect the storage of these modern data streams. These factors may involve concurrently using multiple applications on a single platform, such as recording multiple streams of multimedia content, while simultaneously executing applications, such as Microsoft® Excel® or Microsoft® Word. Some applications generate small random input-output (I/O) tasks for the platform and data storage device. In a scenario like this, a storage controller of the platform will receive numerous I/O requests coming from the concurrent applications. Unfortunately, existing controllers and/or device drivers cannot adequately handle high priority asynchronous data requests and isochronous requests that are received in order to complete the requests by required request deadlines. Existing hardware and software, including device drives, have no means to identify isochronous requests and associated specific completion deadlines for those requests, in order to help prevent bottlenecks and degrades system performance when processing asynchronous and isochronous I/O requests.

In this context, high priority asynchronous requests refer to user interactive requests that are typically serviced with the highest precedence to minimize user wait time. Examples of high priority requests are those issued by interactive applications such as Microsoft® Excel® or Microsoft® Word. Normal priority asynchronous requests are generally less sensitive to timing and include those requests related created by file copying. Isochronous requests are considered requests with soft deadlines that do not need to be serviced immediately but should be serviced within a specific time frame.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

Figure 1:
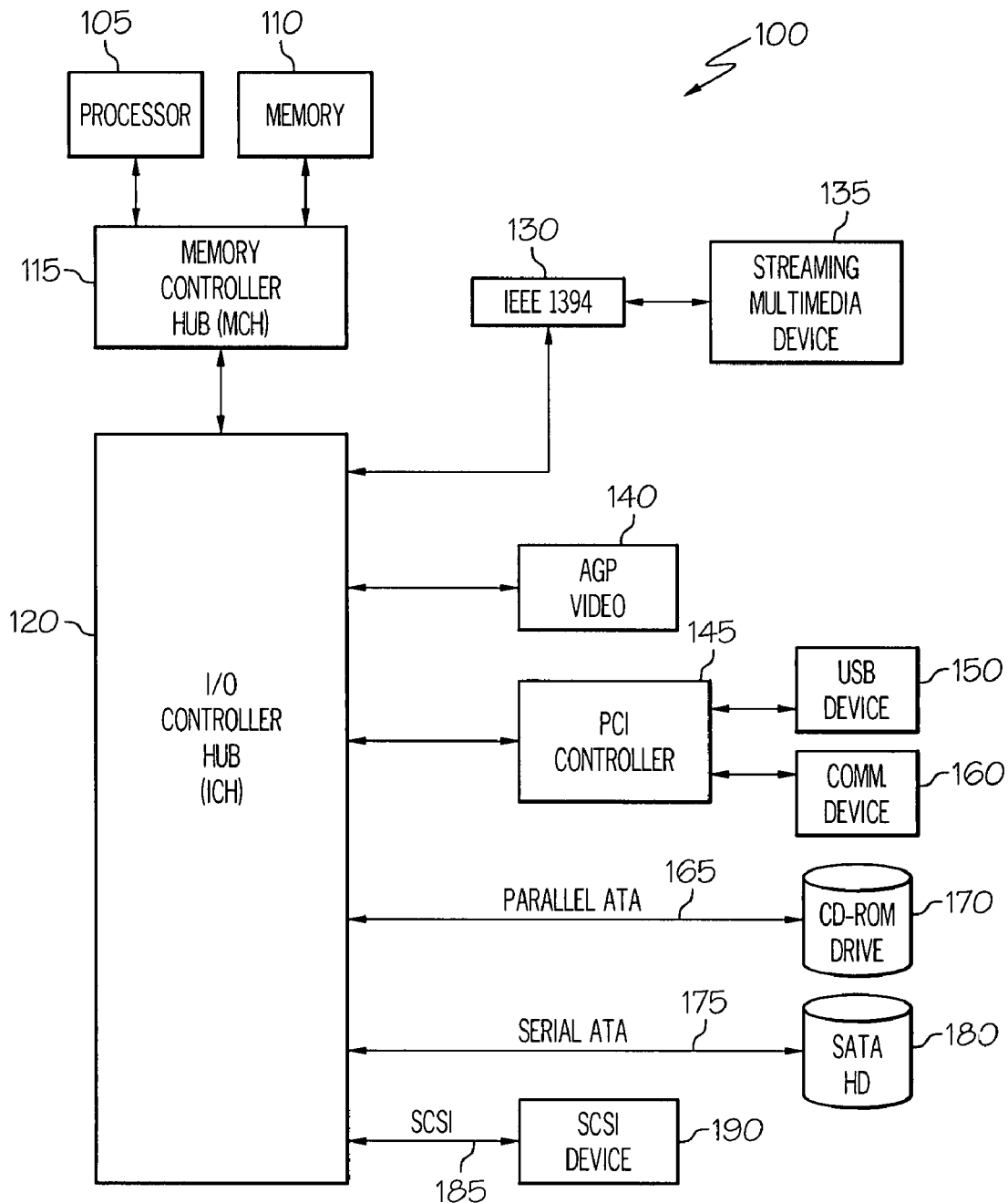
FIG. 1 depicts an apparatus which processes I/O requests for data storage devices, comprising a processor, memory, a memory controller hub, an I/O controller hub, a streaming multimedia device, and several data storage devices.

The following is a detailed description of embodiments depicted in the accompanying drawings. The specification is in such detail as to clearly communicate the embodiments. However, the amount of detail offered is not intended to limit the anticipated variations of embodiments; but on the contrary, the intention is to cover all modifications, equivalents, and alternatives consistent with the spirit and scope of the embodiments as defined by the appended claims.

Generally speaking, methods and apparatuses for processing input and/or output (I/O) requests for data storage devices are contemplated. Apparatus embodiments generally comprise a request receiver to receive a number of input or output requests, a logic module to calculate a deadline value for an isochronous request, where the calculated deadline value relates to the amount of time which has transpired between the creation of the isochronous request and the time the calculation is made, and an issuance module to issue the isochronous request if the calculated deadline value is equal or less than a threshold value. In some embodiments, the threshold value may be calculated as a sum of a seek time, a rotational delay time, a first transmission time, and a product of a second transmission time and a number of outstanding requests. Some embodiments may receive only isochronous requests, while other embodiments may receive a mixture of isochronous requests and asynchronous requests.

Alternative apparatus embodiments may include random access memory (RAM) and one or more data storage devices, such as a serial hard disk drive, a parallel hard disk drive, an optical storage drive, a digital versatile disc drive, or a flash memory drive. Further alternative embodiments may also include a queue module to place requests into queues based on the request type, as well as classify asynchronous requests according to normal and high priorities assigned to the asynchronous requests.

Method embodiments generally comprise receiving a number of requests, wherein at least one of the requests is an isochronous request having an initial deadline value, calculating a new deadline value according to an amount of time which transpires between creation of the isochronous request and the calculation of the new deadline value, and issuing the isochronous request when the new deadline value is less than a threshold value. Some method embodiments include receiving additional requests, such as asynchronous requests and other isochronous requests, before issuing the isochronous request. Alternative method embodiments include issuing another request of the plurality of requests to the data storage device before issuing the isochronous request.

Various method embodiments include placing the isochronous request into an isochronous queue and placing one or more asynchronous requests into an asynchronous queue. Further method embodiments may sort the requests in the isochronous queues or asynchronous queues according to request priorities and deadline values. While some method embodiments comprise issuing the isochronous request if the new deadline value is less than a predetermined value of time, other method embodiments comprise issuing the isochronous request when the new deadline value is less than or equal to a sum of a seek time, a rotational delay time, a first transmission time, and a product of a second transmission time and a number of outstanding requests.

Turning now to the drawings, FIG. 1 shows an embodiment of an apparatus 100 which processes I/O requests for one or more data storage devices. Apparatus 100 may comprise, as examples, a desktop tower platform or a notebook computer. Apparatus 100 may have a processor 105. In some embodiments, processor 105 may comprise a single core processor, while in other embodiments processor 105 may comprise a multiple-core processor. Processor 105 may be coupled to a memory controller hub (MCH) 115.

Processor 105 may execute operating instructions of user applications, such as instructions for multimedia streaming applications, in memory 110 by interacting with MCH 115. MCH 115 may also couple processor 105 with an I/O controller hub (ICH) 120. ICH 120 may allow processor 105 to interact with external peripheral devices, such as keyboards, scanners, data storage devices, and multimedia devices, such as streaming multimedia device 135. For example, streaming multimedia device 135 may comprise a FireWire® hard disk drive or a digital video camera coupled to ICH 120 via a high speed data port, an Institute of Electrical and Electronic Engineers (IEEE) 1394 port 130. [See IEEE p1394 Working Group (1995), IEEE Std. 1394-1995 High Performance Serial Bus, IEEE, ISBN 0-7381-1203-8] [See also IEEE p1394a Working Group (2000), IEEE Std. 1394a-2000 High Performance Serial Bus—Amendment 1, IEEE, ISBN 0-7381-1958-X] [See also IEEE p1394b Working Group (2002), IEEE Std. 1394b-2002 High Performance Serial Bus—Amendment 2, IEEE, ISBN 0-7381-3253-5] A user of apparatus 100 may want to transfer video files out of streaming multimedia device 135 and store them on a different or more permanent storage medium, such as a digital versatile disc (DVD). In alternative embodiments, streaming multimedia device 135 may comprise digital video editing equipment, a digital video cassette recorder, a digital audio player, or any combination or number of such devices.

Apparatus 100 may be configured to present information, such as application windows and streaming multimedia video, to a user via a display device coupled to Advanced Graphics Port (AGP) video card 140. In some embodiments, the type of display device may be a CRT monitor or a LCD screen or a thin-film transistor flat panel monitor.

In some embodiments, ICH 120 and processor 105 may process asynchronous and isochronous I/O requests to store and retrieve data from a universal serial bus (USB) device 150 via a Peripheral Component Interconnect (PCI) controller 145. [See Universal Serial Bus Revision 2.0 specification, 21 Dec. 2000, http://www.usb.org/developers/docs/usb_20_02212005.zip][Also See PCI Local Bus Specification Revision 3.0, 3-February-2004, http://www.pcisig.com/members/downloads/specifications/conventional/PCI _LB3.0-2-6-04.pdf] For example, USB device 150 may comprise a flash drive containing multiple video files. Processor 105 may work in conjunction with ICH 120 to process isochronous read or input requests to retrieve the video files stored on USB device 150 and play them for the user via the display device coupled to AGP video card 140. Concurrently, processor 105 may work in conjunction with ICH 120 to process asynchronous write or output requests to save data files on USB device 150 by way of PCI controller 145. For example, the user may be receiving a word processing document file via communication device 160 and saving it to USB device 150.

In addition to USB device 150, ICH 120 of apparatus 100 may also interact with various data storage devices such as Advanced Technology Attachment (ATA) drives, such as ATA hard drives, CD drives, and DVD drives. [See Information Technology—AT Attachment with Packet Interface—7—Volume 3—Serial Transport Protocols and Physical Interconnect (ATA/ATAPI-7 V3), http://webstore.ansi.org/ansidocstore/product.asp?sku=ANSI+INCITS+397%2D2005+%28Vol%2E+3%29] For example, ICH 120 may be used to read asynchronous and isochronous streams from a compact disc read only memory (CD ROM) drive 170 via a parallel ATA bus 165. CD ROM drive 170 may vary in different embodiments of apparatus 100, such as comprising a compact disc recordable (CD-R) drive, a CD rewritable (CD-RW) drive, a DVD drive, a hard disk drive, a tape drive, or other storage device.

Apparatus 100 may also have a Serial ATA (SATA) bus 175 which may couple a serial hard disk drive, such as SATA hard drive 180, to ICH 120. [See Serial ATA Revision 2.6, February-2007, http://www.serialata.org/specifications.asp] SATA hard disk drive 180 may be used to store and retrieve asynchronous and isochronous streams stored on SATA hard disk drive 180, via asynchronous and isochronous requests processed by processor 105, MCH 115, and ICH 120. Apparatus 100 may also be coupled to other types of hardware devices, such as Small Computer Systems Interface (SCSI) device 190 via a SCSI bus 185. For example, SCSI device 190 may comprise a SCSI hard disk drive or a SCSI Redundant Array of Independent Disks (RAID). Similar to SATA hard disk drive 180, SCSI device 190 may be used to store and retrieve asynchronous and isochronous streams stored on SCSI device 190, via asynchronous and isochronous requests processed by processor 105, MCH 115, and ICH 120.

In different embodiments, processor 105, MCH 115, and memory 110 may operate at relatively fast operating speeds when compared to the operating speed of the individual data storage devices, such as SATA hard disk drive 180 and CD ROM drive 170. Accordingly, each storage device may improve both apparatus 100 performance and the performance of the data storage device by employing a technique referred to as command queuing. For example, one or more data storage devices within apparatus 100 may employ such command queuing methods as Tagged Command Queuing and Native Command Queuing. [See Information Technology—AT Attachment with Packet Interface—7—Volume 3—Serial Transport Protocols and Physical Interconnect (ATA/ATAPI-7 V3), http://webstore.ansi.org/ansidocstore/product.asp?sku=ANSI +INCITS+397%2D2005+%28Vol%2E+3%29] [See Also Serial ATA Revision 2.6, February-2007, http://www.serialata.org/specifications.asp] By employing command queuing, a data storage device, such as a hard drive, may accept numerous asynchronous and isochronous I/O requests, place them in one or more queues, and dynamically reorder outstanding commands before executing them to reduce mechanical overhead and improve I/O latencies.

While apparatus 100 is shown to have numerous peripheral devices attached in the embodiment of FIG. 1, other embodiments may have different combinations of such hardware devices, such as only one or two of the devices. Additionally, apparatus 100 may be coupled with other types of hardware not described, such as a sound card, a scanner, a printer, and other types of hardware devices. Such devices may transmit or receive isochronous and/or asynchronous data, requiring data storage devices of apparatus 100, such as SATA hard disk drive 180, to handle multiple isochronous and/or asynchronous requests. Some embodiments may include additional devices which generate isochronous and/or asynchronous data, such as a keyboard, a microphone, and a web cam. In other words, apparatus 100 depicted in FIG. 1 is intended to provide an illustrative embodiment which may be varied in actual embodiments.

Figure 2:
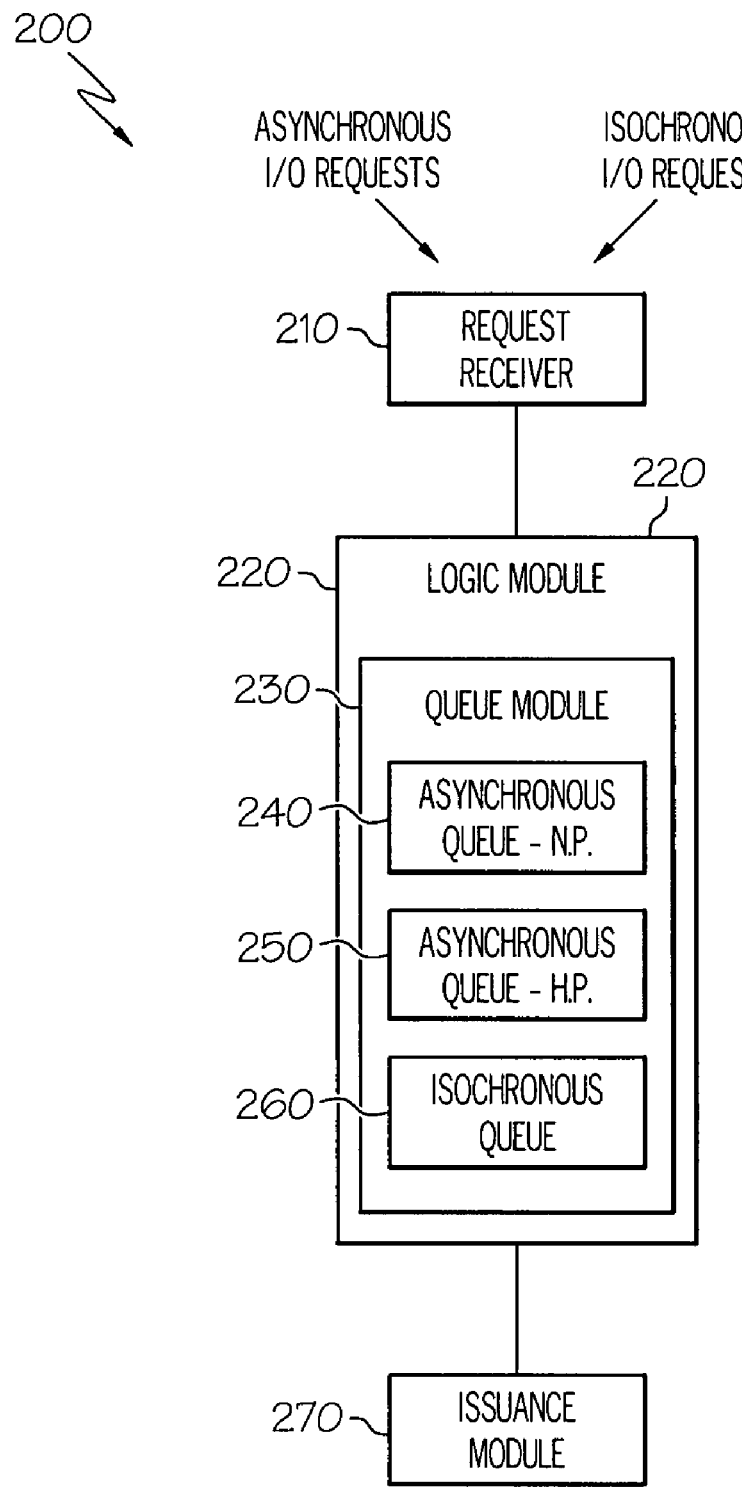
FIG. 2 shows an apparatus for processing asynchronous and isochronous requests, comprising a request receiver, a logic module, and an issuance module.

To better illustrate in more detail how apparatus 100 may process isochronous and/or asynchronous requests, we turn now to FIG. 2. FIG. 2 shows an apparatus 200 for processing asynchronous and isochronous requests, comprising a request receiver 210, a logic module 220, and an issuance module 270. Apparatus 200 may comprise hardware, software, or a combination of hardware and software in one or more parts of apparatus 100 in FIG. 1. For example, apparatus 200 may comprise a chipset of ICH 120 working in conjunction with a software device driver loaded into memory 110.

Apparatus 200 may prioritize asynchronous and isochronous I/O requests and address the issues of interactive I/O request starvation caused by large amounts of queued sequential I/O requests. Additionally, apparatus 200 may address problems associated with isochronous I/O requests encountered with media streaming applications through deadline management, where requests may be serviced "just in time."

As illustrated in FIG. 2, request receiver 210 may receive asynchronous and isochronous I/O requests and transfer the requests to logic module 220 for processing. For example, request receiver 210 may comprise hardware in ICH 120 receiving requests from processor 105, running applications that stream both asynchronous and isochronous data to a data storage device such as SATA hard disk drive 180.

Each request may carry information to characterize it as a normal, a high priority, or an isochronous request. Logic module 220 may separate and store each request into an individual queue via a queue module 230. For example, queue module 230 may store normal priority (N.P.) asynchronous requests in asynchronous queue 240. Similarly, queue module 230 may store high priority (H.P.) asynchronous requests in asynchronous queue 250 and store isochronous requests in isochronous queue 260. As new isochronous requests enter apparatus 200, queue module 230 may insert the new isochronous requests into isochronous queue 260 using a deadline value as a sorting parameter. As a result, isochronous queue 260 may remain sorted in ascending deadline order. To simply the maintenance of a sorted queue, absolute deadlines in terms of system time can be calculated and used as the sorting value to ensure the queue remains sorted in ascending deadline order while new isochronous requests are inserted.

Each isochronous request may have an associated time stamp (Timestamp_Origin), taken at the time the request originates from a high level application. For example, the request may comprise a request to store a large quantity of streaming audio-video information originating from streaming multimedia device 135, based on processor 105 executing instructions associated with a personal video recorder (PVR) application. Logic module 220, which may be thought of as a dispatcher, may scan through isochronous queue 260 to pick out the next request to issue to a data storage device, via issuance module 270. During each scan, logic module 220 may recalculate the deadline value of each pending request and determine a new deadline value as follows:

New deadline=original deadline−(Timestamp_Current−Timestamp_Origin);

wherein "Timestamp_Current" refers to a timestamp at the time logic module 220 performs the calculation. In performing this calculation, the time elapsed while the request is queued can be taken into account. In other words, the new deadline may take into account both the age of the command and the length of time that it has been pending in isochronous queue 260. Depending on the embodiment, logic module 220 may only update the "New deadline" value of the request packet at the time of issuance to the data storage device, or transfer to issuance module 270. Alternatively, logic module 220 may reduce issuance decision computation time by calculating the absolute deadline of an isochronous request in terms of system time when the request is first placed in isochronous queue 260:

Absolute deadline=current system time+(original deadline−(Timestamp_Current−Timestamp_Origin)

The dispatch policy of logic module 220 may use a threshold value called "isochronous dispatch threshold" to determine whether to issue the isochronous request. If the new deadline is less than or equal to the isochronous dispatch threshold, logic module 220 may issue the request to the data storage device. Alternatively if an absolute deadline is used, an isochronous request with an absolute deadline less than or equal to (current system time+threshold value) may be issued. Since the native queue of the data storage device may only contain a limited number of queue slots, using this threshold value may prevent isochronous requests with large deadlines from taking up the native queue for an extended period of time and inadvertently starving high priority asynchronous requests.

One manner of calculating a minimum threshold value (MINTV), may be with the following criterion:

MINTV=(Expected time for the isochronous request to complete)+(Estimated total time of all other outstanding commands currently in the native queue of the device to complete) +(Estimated time padding for the isochronous request to propagate back to higher stack requestor upon completion)

Alternatively, the minimum threshold value (MINTV) may be calculated with the following criterion:

MINTV=(Storage device interface overhead latency for data access+Ttx+ Ttx*NumberOfOutstandingHighPriorityRequests)

Storage device interface overhead latency for data access may be considered as the inherent delay for the storage device to find the location on the media where data access will take place, which is generally independent of the size of the data request. Ttx may represent the average time to transmit requested data blocks to or from the data storage device. "Ttx*NumberOfOutstandingHighPriorityRequests" may represent the total quantity of time required to service the high priority requests already issued to the native queue of the data storage device, such as a hard disk drive. The term "Ttx*NumberOfOutstandingHigh PriorityRequests" may be necessary to give the device enough time padding to finish servicing high priority requests first while meeting the deadline of the subsequently issued isochronous requests. This criterion may ensure that there is enough time padding to accommodate the physical limitations of a data storage device.

A minimum threshold value (MINTV), which may be for a hard disk drive, may be calculated with the following criterion:

$$MINTV = (Tseek + Trotational\_delay(RPM\ dependent) + Ttx + Ttx * NumberOfOutstandingHighPriorityRequests)$$

wherein "Tseek" may represent the seek time associated with the disk mechanical head seeking to the correct track where the data is located; and "Trotational_delay" may refer to the post "Tseek" delay encountered by the disk mechanical head traveling to the starting sector of the accessed data in the storage medium of the data storage device. The sum of "Tseek""Trotational_delay" may equal be equal to the storage device interface latency for data access.

As a service policy of a data storage device may tend to complete high priority requests first, and then attempt to meet isochronous deadlines second, additional processing logic may be installed in logic module 220 the data storage device to proportionally increment the threshold value according to the number of outstanding high priority requests already issued to the native queue of the data storage device. One may desire to exercise caution when calculating a threshold value. If the threshold value is too large, a large number of isochronous requests may be outstanding in the native queue of the data storage device and prevent the apparatus 200, which may exist as a software driver, from dispatching higher priority requests. Conversely, if the threshold value is too small, apparatus 200 may postpone issuance of the request and run the risk of the data storage device missing isochronous deadlines.

Figure 3:
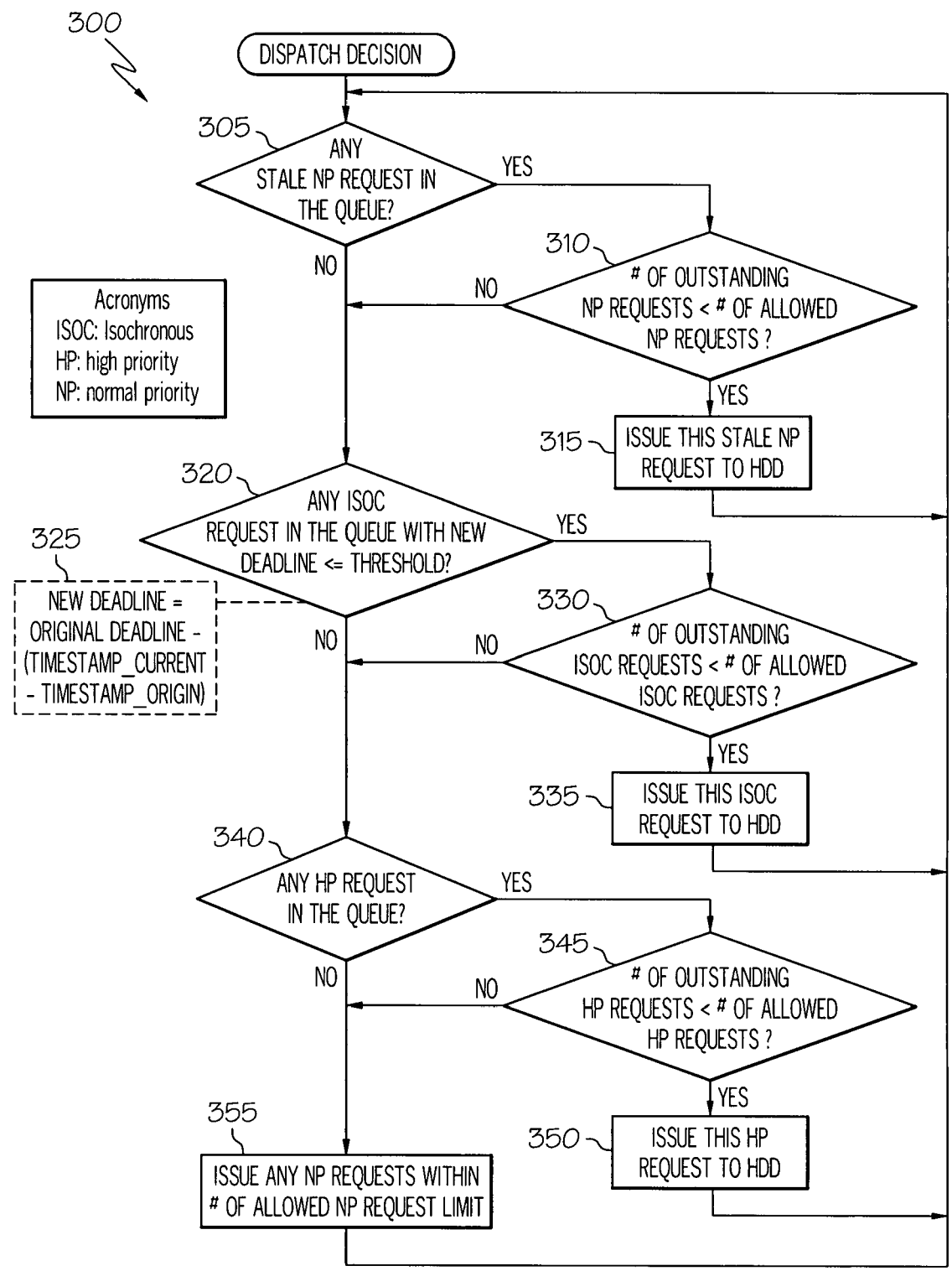
FIG. 3 illustrates the operation of a driver dispatch policy algorithm for hardware and/or software used in communicating with a data storage device.

As previously mentioned, I/O requests may be processed via hardware, software, or a combination of both. FIG. 3 depicts a flowchart 300 which illustrates the operation of a driver dispatch policy algorithm for hardware and/or software used in communicating with a data storage device. The driver dispatch policy algorithm may alleviate the contention between prioritized asynchronous I/O requests and isochronous I/O requests at the data storage device level. As a precondition, the data storage device, such as hard disk drive, may need to have built-in isochronous and prioritized I/O request service policy logic, as well as a native request queue.

The embodiment of the dispatch policy algorithm depicted in FIG. 3 starts by first determining whether there are any stale normal priority asynchronous requests in an associated queue (element 305). For example, when a normal request is placed in an asynchronous queue 240 for a period of time longer than a "stale value," determined by logic module 220, it may be considered stale and starved. This situation may be caused by the higher issuance precedence of high asynchronous and isochronous requests.

If a normal priority asynchronous request has been queued for more than a set period of time, it may be considered stale and may need to take issuance precedence over impending isochronous requests (second deadline is equal to or less than a threshold value) and high priority asynchronous requests. However, only a certain number of stale normal requests may be issued in a batch. When this limit is exceeded, the issuance precedence may switch back to high priority asynchronous and impending isochronous requests. The issuance logic, which may be determined by logic module 220, may switch back and forth between stale normal, high priority and impending isochronous to insure no I/O request types are starved. Without the presence of stale normal priority asynchronous requests, high priority asynchronous requests may take higher issuance precedence, followed by impending isochronous requests. In summary, request issuance may be determined as follows: stale normal(only a fixed number of stale normal may be issued, after that priority may go back to high priority asynchronous and impending isochronous, with the counter of "issued stale normal" being reset)>high priority>impending isochronous>normal.

If there are indeed stale normal requests, the dispatch policy algorithm may then determine whether the number of outstanding normal priority requests is less than a permissible number of normal priority requests (element 310). This limit may be a preventative mechanism to avoid a large amount of normal requests from overflowing the native queue of the data storage device and consequently impede immediate issuance of future high priority or impending isochronous requests. If the number of outstanding normal priority requests is lower than the permissible number of normal priority requests (element 310), the dispatch policy algorithm may issue one normal priority request to the data storage device (element 315).

If there are no normal priority asynchronous requests (element 305), or if the number of outstanding normal priority requests is not less than a permissible number of normal priority requests (element 310), then the dispatch policy algorithm may calculate new deadlines for any isochronous requests in the isochronous queue (elements 325 and 320). If there is an isochronous request in the isochronous queue which has a new deadline less than or equal to a threshold value (element 320) and if the number of outstanding isochronous requests is less than a permissible number of isochronous requests (element 330), the dispatch policy algorithm may issue the isochronous request to the data storage device (element 335). For example, a 100 megabyte (Mb) video stream of data may have accumulated in memory 110 of apparatus 100. The application which generated the data may depend on a stated or published specification of a hard disk drive, requiring that the data be transferred out of memory and onto the hard drive. Otherwise, allotted memory of the application may run out, due to additional video data streaming in, and cause processor 105 to terminate the video application. The threshold value may be set to 50 milliseconds, for example, to prevent such a problem. If the new deadline of the isochronous request is calculated to be 50 or less milliseconds, the dispatch policy algorithm may issue the isochronous request.

The embodiment of the dispatch policy algorithm depicted in FIG. 3 may proceed by determining whether there are any pending high priority asynchronous requests in the high priority asynchronous queue (element 340) and, if so, determining whether the number of outstanding high priority requests is less than a permissible number of high priority requests (element 345). If the number of high priority requests already issued to the native queue of the data storage device is less than the permissible number of high priority requests (element 345), the dispatch policy algorithm may issue one high priority request to the data storage device (element 350). If there are no pending high priority asynchronous requests in the high priority asynchronous queue (element 340), the dispatch policy algorithm may issue normal priority requests within a permissible number or limit of normal priority requests (element 355) and start the process over again (element 305).

Figure 4:
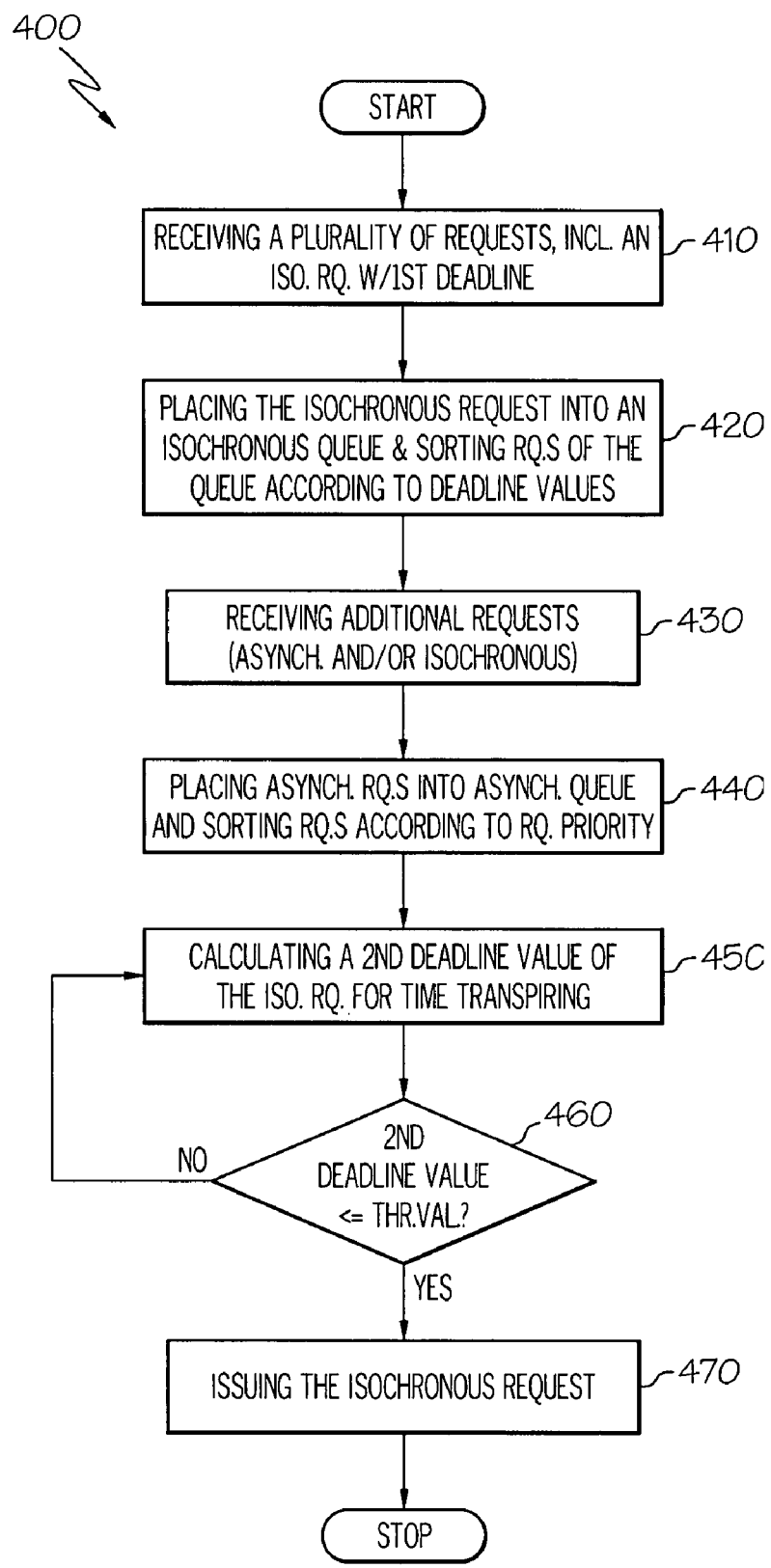
FIG. 4 illustrates a method of prioritizing isochronous and asynchronous requests of a data storage device.

FIG. 4 depicts a flowchart 400 illustrating an embodiment of a method of prioritizing isochronous and asynchronous requests for a data storage device. Flowchart 400 begins with receiving a plurality of requests which includes an isochronous request with a first deadline (element 410). For example, processor 105 may generate an isochronous read request to retrieve data from CD ROM drive 170 as shown in FIG. 1. An embodiment according to flowchart 400 may continue by placing the isochronous request into an isochronous queue and sorting requests in the isochronous queue according to deadline values associated with the requests (element 420). For example, queue module 230 in FIG. 2 may sort three pending isochronous requests pending in isochronous queue 260 in ascending order based upon deadlines associated with each of the requests.

An embodiment according to flowchart 400 may continue by receiving additional asynchronous and/or isochronous requests (element 430). For example, logic module 220 may receive additional requests from request receiver 210 before pending requests in the queues of queue module 230 can be transferred to the data storage device coupled with issuance module 270. An embodiment according to flowchart 400 may continue by placing asynchronous requests into their designated asynchronous queue (element 440). Continuing with our previous example, queue module 230 may place the additional requests received by request receiver 210 into queues based upon the type (normal or high priority), while logic module 220 may sort the requests of the queues based upon deadline values assigned to the requests. In alternative embodiments, queue module 230, instead of logic module 220, may sort the requests of the queues based upon deadline values assigned to the requests. In even further alternative embodiments, logic module 220 or queue module 230 may sort the pending requests according to other priority values, such the type of the request (some commands may receive higher priority than others) or order of arrival.

The method of flowchart 400 may then calculate a second deadline value of the isochronous request (element 450), based on the amount of time that has transpired since the creation of the request or since the time that the request was placed in the queue. Again continuing with our previous example, logic module 220 may recalculate the deadline value of the isochronous request in isochronous queue 260 according to the formula "New deadline=original deadline− (Timestamp_Current−Timestamp_Origin)," as described in the discussion for FIG. 2. If the second deadline value is less than or equal to a threshold value (element 460), the method of flowchart 400 may continue by issuing the isochronous request (element 470). Still continuing with our example, logic module 220 may determine whether the newly calculated deadline value is less than or equal to a predetermined threshold value which is selected based upon the physical limitations of disk seek time, rotational delay, and data transfer time of the hard disk drive coupled to issuance module 270.

It will be apparent to those skilled in the art having the benefit of this disclosure that the embodiments herein contemplate methods and apparatuses for processing I/O requests for data storage devices. It is understood that the form of the embodiments shown and described in the detailed description and the drawings are to be taken merely as examples. It is intended that the following claims be interpreted broadly to embrace all the variations of the embodiments disclosed.

Although some aspects have been described in detail for some embodiments, it should be understood that various changes, substitutions and alterations can be made herein without departing from the spirit and scope of the embodiments as defined by the appended claims. Although one embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the embodiments herein. Accordingly, the appended claims are intended to include within their scope such processes, machines, manufacture, compositions of matter, means, methods, or steps.

What is claimed is:

1. A method of issuing isochronous requests and asynchronous requests to a data storage device, comprising:
storing a plurality of isochronous requests in a queue, wherein each isochronous request of the plurality of isochronous requests has an associated deadline value;
sorting the plurality of isochronous requests in the queue for issuance based on the associated deadline values;
receiving one or more asynchronous requests;
placing the one or more asynchronous requests into one or more designated asynchronous queues of requests awaiting issuance to the data storage device;
calculating a new deadline value for a first isochronous request of the plurality of isochronous requests in the queue, wherein the calculating the new deadline value comprises determining an amount of time related to the duration the first isochronous request has been pending;
placing the first isochronous request at the head of the queue based upon the new deadline value;
comparing the new deadline value associated with the first isochronous request to a threshold value; and
not issuing the first isochronous request if the new deadline value is greater than the threshold value.

2. The method of claim 1, wherein the placing the one or more asynchronous requests into one or more designated asynchronous queues comprises placing a first asynchronous request with a normal priority into a first asynchronous queue and placing a second asynchronous request with a high priority into a second asynchronous queue.

3. The method of claim 1, wherein the threshold value comprises a predetermined value of time based upon an interval of time to process a request to issue the isochronous request.

4. The method of claim 1, further comprising issuing the first isochronous request if the new deadline value is equal to or less than the threshold value, wherein the threshold values equals a sum of a first time of completion for the first isochronous request and a second time of completion for all other outstanding commands in a native queue of the data storage device and a padding time for the first isochronous request.

5. The method of claim 1, further comprising issuing the first isochronous request if the new deadline value is equal to or less than a sum of a latency of an interface of the data storage device and a first transmission time and a product of a second transmission time and a number of outstanding requests in a native queue of the data storage device.

6. The method of claim 1, further comprising issuing the first isochronous request to one of a hard disk drive and an optical storage drive if the new deadline value is equal to or less than a sum of a seek time, a rotational delay time, a first transmission time, and a product of a second transmission time and a number of outstanding requests in a native queue of the data storage device.

7. The method of claim 1, further comprising issuing the first isochronous request if the new deadline value less than or equal to the threshold value.

8. The method of claim 7, wherein the issuing the first isochronous request further comprises issuing the first isochronous request if the number of outstanding isochronous requests is less than a permissible number of outstanding isochronous requests.

9. An apparatus for processing requests for a data storage device, comprising:
- a request receiver to receive a plurality of isochronous requests, wherein each isochronous request of the plurality of isochronous requests has an associated deadline value, wherein further each isochronous request has a first associated timestamp value which is related to the time the associated isochronous request originates from a high level application;
- a logic module to calculate, via the first associated timestamp value for each isochronous request, a second deadline value for the isochronous request, wherein calculation of the second deadline value comprises determining an amount of time related to the duration the isochronous request has been pending in an isochronous queue, wherein the logic module is configured to sort isochronous requests of the plurality of requests in the isochronous queue based on the associated deadline values; and
- an issuance module to transfer an isochronous request at the head of the isochronous queue to the data storage device based upon a threshold value being greater than the second deadline value of the isochronous request at the head of the isochronous queue.

10. The apparatus of claim 9, further comprising random access memory, wherein the data storage device comprises one of a serial hard disk drive, a parallel hard disk drive, an optical storage drive, a digital versatile disc drive, and a flash memory drive.

11. The apparatus of claim 9, wherein the request receiver is arranged to receive asynchronous requests and isochronous requests.

12. The apparatus of claim 11, further comprising a queue module to classify the asynchronous requests according to normal and high priorities.

13. The apparatus of claim 12, wherein:
- the logic module is configured to determine whether an asynchronous request has been pending in an asynchronous queue for a period of time longer than a predetermined value of time; and
- the issuance module is to issue the asynchronous request before issuing the isochronous request at the head of the isochronous queue if the asynchronous request has been pending for longer than the predetermined value of time.

14. The apparatus of claim 13, wherein the issuance module issues an asynchronous request of high priority before issuing the isochronous request.

15. The apparatus of claim 9, wherein the second deadline value equals the first deadline value less the difference of a second associated timestamp value and the first associated timestamp value, wherein the second associated timestamp value is related to the time of calculation of the second deadline value.

16. The apparatus of claim 9, wherein the threshold value is equal to a sum of a seek time, a rotational delay time, a first transmission time, and a product of a second transmission time and a number of outstanding requests.

17. A method of prioritizing isochronous requests and asynchronous requests for a data storage device, comprising:
- receiving a plurality of isochronous requests;
- placing the isochronous requests into an isochronous queue of requests awaiting issuance to the data storage device;
- sorting the isochronous requests in the isochronous queue according to deadline values associated with the isochronous requests;
- receiving a plurality of asynchronous requests;
- placing the plurality of asynchronous requests into one or more designated asynchronous queues of requests awaiting issuance to the data storage device;
- selecting a first isochronous request, wherein the first isochronous request is at the head of the isochronous queue;
- comparing the deadline value associated with the first isochronous request to a threshold value; and
- not issuing the first isochronous request if the deadline value associated with the first isochronous request is greater than the threshold value.

18. The method of claim 17, wherein:
- the receiving the plurality of isochronous requests comprises receiving the first isochronous request, the first isochronous request having a first deadline value;
- the sorting comprises:
  - calculating a second deadline value associated with the first isochronous request based on the first deadline value less the difference between a current time stamp and an origin timestamp; and
  - placing the first isochronous request at the head of the isochronous queue based upon the second deadline value; and
- the not issuing comprises not issuing the first isochronous request if the second deadline value is greater than the threshold value.

19. The method of claim 17, wherein the threshold value corresponds to a physical characteristic of a storage device.

20. The method of claim 19, wherein the physical characteristic corresponds to at least one of a disk seek time, a rotational delay, and a data transfer time of a hard disk drive.

21. The method of claim 17, further comprising issuing the first isochronous request if the deadline value associated with the first isochronous request is less than or equal to the threshold value, wherein the asynchronous queue is not empty at the issuance of the isochronous request.

22. The method of claim 21, wherein the issuing the first isochronous request further comprises issuing the first isochronous request if the number of outstanding isochronous requests is less than a permissible number of outstanding isochronous requests, wherein the asynchronous queue is not empty at the issuance of the isochronous request.

23. The method of claim 17, wherein:
- placing the one or more asynchronous requests into the one or more designated asynchronous queues comprises placing the one or more asynchronous requests into a high priority asynchronous queue and into a normal priority asynchronous queue; and
- the method further comprises:
  - determining that a normal priority asynchronous request has been pending in the normal priority asynchronous queue for a period of time longer than a predetermined period of time; and
  - issuing the normal priority asynchronous request ahead of a high priority asynchronous request as a result of the determination.

24. The method of claim 17, wherein:
- the placing the one or more asynchronous requests into the one or more designated asynchronous queues comprises placing the one or more asynchronous requests into a high priority asynchronous queue and into a normal priority asynchronous queue; and the method further comprises performing a loop, the loop comprising the following steps performed in the order indicated:

issuing a normal priority asynchronous request if the normal priority asynchronous request has been pending in the normal priority asynchronous queue for a period of time longer than a predetermined period of time and if the number of outstanding normal priority asynchronous requests is less than a permissible number of outstanding normal priority asynchronous requests;

if a normal priority asynchronous request was not issued in performing the loop:

recalculating the deadline values associated with the isochronous requests in the isochronous queue, the recalculating comprising determining amounts of time related to the duration the isochronous requests have been pending;

issuing a second isochronous request at the head of the isochronous queue if a deadline value associated with the second isochronous request is less than or equal to the threshold value and if the number of outstanding isochronous requests is less than a permissible number of outstanding isochronous requests;

if a normal priority asynchronous request was not issued in performing the loop and if an isochronous request was not issued in performing the loop, issuing a high priority asynchronous request in the high priority asynchronous queue if the number of outstanding high priority asynchronous requests is less than a permissible number of outstanding high priority asynchronous requests.

* * * * *